United States Patent
Omiya et al.

(10) Patent No.: US 11,458,892 B2
(45) Date of Patent: Oct. 4, 2022

(54) IMAGE GENERATION DEVICE AND IMAGE GENERATION METHOD FOR GENERATING A COMPOSITE IMAGE

(71) Applicant: DENSO CORPORATION, Kariya (JP)

(72) Inventors: Shogo Omiya, Kariya (JP); Hirohiko Yanagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 145 days.

(21) Appl. No.: 16/986,587

(22) Filed: Aug. 6, 2020

(65) Prior Publication Data

US 2020/0361378 A1 Nov. 19, 2020

Related U.S. Application Data

(63) Continuation of application No. PCT/JP2019/001873, filed on Jan. 22, 2019.

(30) Foreign Application Priority Data

Feb. 9, 2018 (JP) .............................. JP2018-021840

(51) Int. Cl.
  *B60R 1/00* (2022.01)
  *G06T 7/70* (2017.01)
  (Continued)

(52) U.S. Cl.
  CPC .................. *B60R 1/00* (2013.01); *G06T 7/70* (2017.01); *G06T 11/60* (2013.01); *H04N 5/247* (2013.01);
  (Continued)

(58) Field of Classification Search
  None
  See application file for complete search history.

(56) References Cited

U.S. PATENT DOCUMENTS 7,161,616 B1 * 1/2007 Okamoto ................. B60R 1/00
  348/E7.086
7,684,593 B2 * 3/2010 Chinomi ................. G06T 15/20
  382/104
(Continued)

FOREIGN PATENT DOCUMENTS

JP 8-305999 A 11/1996

OTHER PUBLICATIONS

Japanese Application No. 19950112807 to Tanaka, published on Feb. 8, 2007.*

*Primary Examiner* — Paul F Payer
(74) *Attorney, Agent, or Firm* — Maschoff Brennan

(57) ABSTRACT

An embodiment of the present disclosure relates to an image generation device including an image acquisition unit, a position recognition unit, a boundary line setting unit, and an image compositing unit. The image acquisition unit is mounted to a vehicle, and configured to acquire a plurality of captured images in which the periphery of the vehicle is imaged by a plurality of imaging units having an overlap region where imaging regions thereof partially overlap with each other. The position recognition unit is configured to recognize positions of specific obstacles which are one or more obstacles positioned in the overlap region. The boundary line setting unit is configured to set the boundary line so that each of the specific obstacles is contained in the image captured by the imaging unit which is closest in distance to the specific obstacle, among the plurality of imaging units. The image compositing unit is configured to generate a composite image in which the plurality of captured images are combined, using the boundary line as a boundary when combining the plurality of captured images.

15 Claims, 9 Drawing Sheets

(51) Int. Cl.
  *G06T 11/60* (2006.01)
  *H04N 5/247* (2006.01)
  *H04N 7/18* (2006.01)
(52) U.S. Cl.
  CPC ........ *H04N 7/181* (2013.01); *B60R 2300/105* (2013.01); *B60R 2300/20* (2013.01); *B60R 2300/304* (2013.01); *B60R 2300/607* (2013.01); *B60R 2300/8093* (2013.01); *G06T 2207/30261* (2013.01)

(56) References Cited

U.S. PATENT DOCUMENTS

| | | | | |
|---|---|---|---|---|
| 8,503,729 | B2* | 8/2013 | Kumagai | G06T 3/4038 |
| | | | | 701/1 |
| 8,655,019 | B2* | 2/2014 | Kamiyama | B60R 1/00 |
| | | | | 382/104 |
| 2012/0170812 | A1 | 7/2012 | Kamiyama | |
| 2012/0219190 | A1 | 8/2012 | Kumagai | |
| 2019/0019045 | A1 | 1/2019 | Ogura | |

* cited by examiner

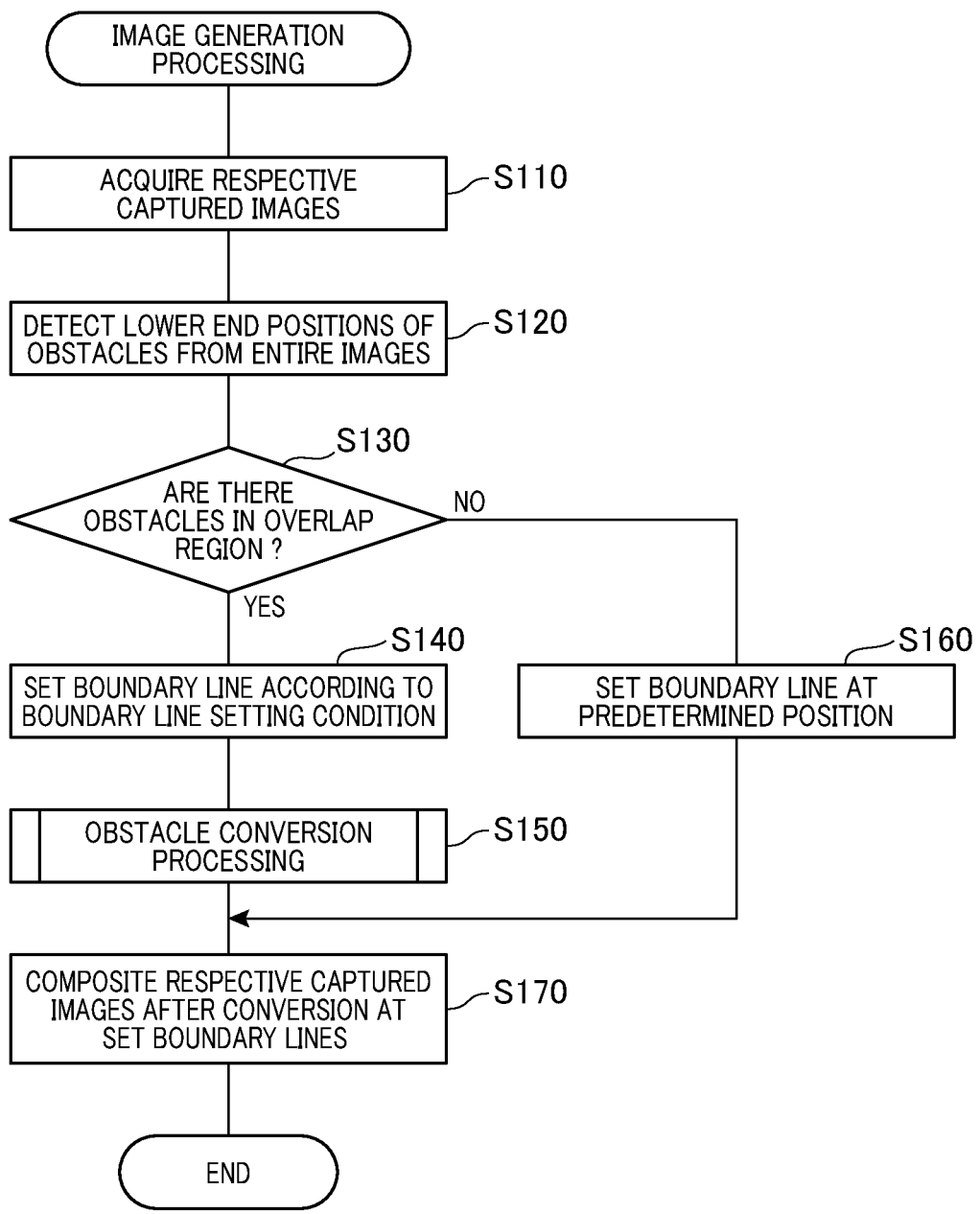

FIG.4

| BOUNDARY LINE SETTING CONDITION A |
|---|
| (1) BOUNDARY LINE IS DETERMINED SO THAT OBSTACLE IS CONTAINED IN IMAGE CAPTURED BY CAMERA CLOSER TO THE OBSTACLE<br>(2) LOWER END PARTS OF OBSTACLES ARE AVOIDED<br>(3) BOUNDARY LINE IS MADE CLOSER TO PREDETERMINED POSITION |

| BOUNDARY LINE SETTING CONDITION B |
|---|
| (1) A PLURALITY OF BOUNDARY LINES ARE TEMPORARILY SET WHILE AVOIDING REGIONS OF OBSTACLES<br>(2) LOWER END PARTS OF OBSTACLES ARE AVOIDED<br>(3) BOUNDARY LINE CANDIDATE CLOSE TO PREDETERMINED POSITION IS SELECTED |

| BOUNDARY LINE SETTING CONDITION C |
|---|
| (1) BOUNDARY IS DETERMINED SO THAT OBSTACLES ARE CONTAINED IN CAPTURED IMAGE IN WHICH THERE ARE A LARGER NUMBER OF OBSTACLES DETECTED IN OVERLAP REGION<br>(2) LOWER END PARTS OF OBSTACLES ARE AVOIDED<br>(3) BOUNDARY LINE IS MADE CLOSER TO PREDETERMINED POSITION | ated States Patent (US 11,458,892 B2)

IMAGE GENERATION DEVICE AND IMAGE GENERATION METHOD FOR GENERATING A COMPOSITE IMAGE

CROSS-REFERENCE TO RELATED APPLICATION

This application is the U.S. bypass application of International Application No. PCT/JP2019/001873 filed on Jan. 22, 2019 which designated the U.S. and claims priority to Japanese Patent Application No. 2018-021840 filed on Feb. 9, 2018, the contents of both of which are incorporated herein by reference.

TECHNICAL FIELD

The present disclosure relates to an image generation device and an image generation method for generating a composite image in which captured images obtained by a plurality of imaging units are composited.

BACKGROUND

As a conventional technique, JP 5503660 B discloses an image generation device, as described above, in which a boundary line between captured images is set so as not to cut the closest obstacle and a plurality of captured images are composited using the boundary line.

SUMMARY

An aspect of the present disclosure relates to an image generation device including an image acquisition unit, a position recognition unit, a boundary line setting unit, and an image compositing unit. The image acquisition unit is mounted to a vehicle, and configured to acquire a plurality of captured images in which the periphery of the vehicle is imaged by a plurality of imaging units having an overlap region where imaging regions thereof partially overlap with each other. The position recognition unit is configured to recognize positions of specific obstacles which are one or more obstacles positioned in the overlap region. The boundary line setting unit is configured to set the boundary line so that each of the specific obstacles is contained in the image captured by the imaging unit which is closest in distance to the specific obstacle, among the plurality of imaging units. The image compositing unit is configured to generate a composite image in which the plurality of captured images are combined, using the boundary line as a boundary when combining the plurality of captured images.

BRIEF DESCRIPTION OF THE DRAWINGS

The above features of the present disclosure will be made clearer by the following detailed description, given referring to the appended drawings. In the accompanying drawings:

FIG. 3 is a flowchart of image generation processing;

FIG. 4 is an explanatory view showing boundary line setting conditions;

DETAILED DESCRIPTION OF THE PREFERRED EMBODIMENTS

As a result of the inventor's detailed research, the conventional technique disclosed in JP 5503660 B has been found to involve a problem that, when there are multiple obstacles, it may result in a composite image with other obstacles being cut may be obtained, and, in this case, that the visibility of the composite image is deteriorated.

An object of the present disclosure is to improve the visibility of a composite image in an image generation device for generating a composite image in which captured images obtained by a plurality of imaging units are composited.

An aspect of the present disclosure relates to an image generation device including an image acquisition unit, a position recognition unit, a boundary line setting unit, and an image compositing unit. The image acquisition unit is mounted to a vehicle, and configured to acquire a plurality of captured images in which the periphery of the vehicle is imaged by a plurality of imaging units having an overlap region where imaging regions thereof partially overlap with each other. The position recognition unit is configured to recognize positions of specific obstacles which are one or more obstacles positioned in the overlap region. The boundary line setting unit is configured to set the boundary line so that each of the specific obstacles is contained in the image captured by the imaging unit which is closest in distance to the specific obstacle, among the plurality of imaging units. The image compositing unit is configured to generate a composite image in which the plurality of captured images are combined, using the boundary line as a boundary when combining the plurality of captured images.

According to such a configuration, the boundary line is set within the overlap region while avoiding the specific obstacles, thereby making it possible to prevent the obstacles from being cut by the boundary line in the composite image. Accordingly, the visibility of the composite image can be improved.

Embodiments of the present disclosure will be described hereinafter with reference to the drawings.

1. First Embodiment

1-1. Configuration

Figure 1:
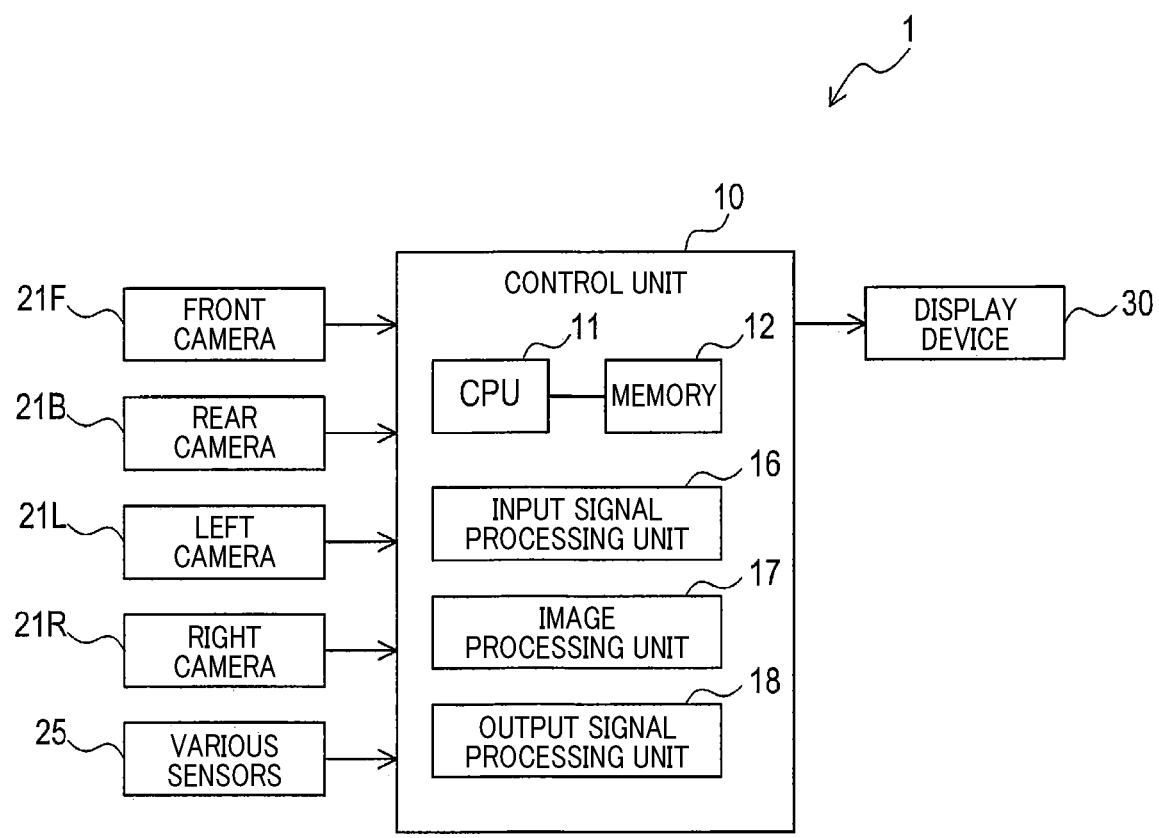
FIG. 1 is a block diagram showing the configuration of an image generation system.

As shown in FIG. 1, an image generation system 1 of the present embodiment is a system mounted to a vehicle such as a passenger car, and includes at least a control unit 10. The image generation system 1 may also include a front camera 21F, a rear camera 21B, a right camera 21R, a left camera 21L, various sensors 25, a display device 30, and the like. The vehicle in which the image generation system 1 is mounted is referred to also as an own vehicle.

Figure 2:
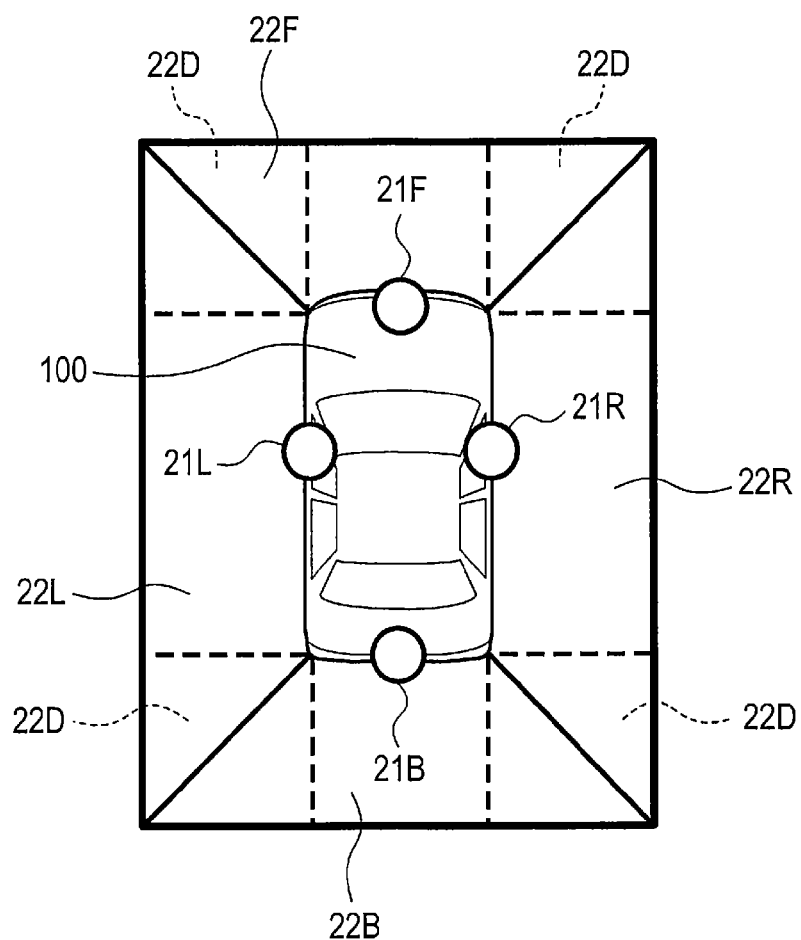
FIG. 2 is a bird's eye view showing an arrangement example of cameras.

Each of the cameras 21F, 21B, 21L and 21R is arranged in the periphery of the vehicle, as shown in FIG. 2. Specifically, the front and rear cameras 21F and 21B have the functions to image a road on the front and rear sides, respectively, of the own vehicle, and are attached to the front and rear parts, respectively, of the own vehicle. In addition, the right and left cameras 21R and 21L have the functions to image a road on the right and left sides, respectively, of the own vehicle, and are attached to the right and left side rear-view mirrors, respectively, of the own vehicle.

Specifically, the front camera 21F images the entire region on the front side beyond the front face of the own vehicle as a front imaging region 22F. The rear camera 21B images the entire region on the rear side beyond the rear face of the own vehicle as a rear imaging region 22B. The right camera 21R images the entire region on the right side beyond the right-side face of the own vehicle as a right imaging region 22R. The left camera 21L images the entire region on the left side beyond the left-side face of the own vehicle as a left imaging region 22L.

In addition, the respective cameras 21F, 21B, 21L and 21R are set so that the imaging regions thereof at least partially overlap with each other and that captured images include an overlap region. It should be noted that the overlap region refers to a region included overlappingly in a plurality of captured images due to overlap of the imaging regions of the plurality of cameras 21F, 21B, 21L and 21R. In the example shown in FIG. 2, regions where the imaging regions overlap with each other are produced on the right and left on the front side of the own vehicle and the right and left on the rear side thereof. These regions are overlap regions 22D in a bird's eye view.

The various sensors 25 are well-known sensors that detect the state of the own vehicle. For example, the various sensors 25 detect the vehicle speed, acceleration, yaw rate, current location, obstacles around the own vehicle, position of a gear shift lever, and the like. The various sensors 25 send the detection results to the control unit 10.

The display device 30 is configured as a well-known display such as a liquid crystal display. The display device 30 is arranged in the vehicle compartment.

The control unit 10 includes a microcomputer having a CPU 11 and a semiconductor memory (hereinafter referred to as memory 12) such as a RAM or ROM. The respective functions of the control unit 10 are realized by the CPU 11 executing programs stored in a non-transitory tangible storage medium. In this example, the memory 12 corresponds to the non-transitory tangible storage medium having the programs stored therein. In addition, methods corresponding to the programs are executed upon execution of the programs. It should be noted that the non-transitory tangible storage medium means any storage media except electromagnetic waves. In addition, the control unit 10 may include one microcomputer or a plurality of microcomputers.

The control unit 10 includes an input signal processing unit 16, an image processing unit 17, and an output signal processing unit 18, as shown in FIG. 1. Techniques for realizing the functions of the respective units included in the control unit 10 are not limited to software, and some or all of the functions may be realized by using one or more pieces of hardware. For example, when the above functions are each realized by an electronic circuit which is hardware, the electronic circuit may be realized by a digital circuit or an analog circuit, or a combination of these circuits.

The function of the input signal processing unit 16 involves acquiring the images captured by the respective cameras 21F, 21B, 21L and 21R and the detection results by the various sensors 25 and storing them in the memory 12.

The function of the image processing unit 17 involves executing, for example, image generation processing as will be described later to generate a bird's eye view image, as an image in which the road around the vehicle is looked down from the vertical direction, from the images captured by the respective cameras 21F, 21B, 21L and 21R. This bird's eye view image contains obstacles on the road. It should be noted that the obstacles mean any objects that can disturb the traveling of the vehicle, such as other vehicles which are vehicles except the own vehicle, pedestrians, bicycles, curbs, and walls.

The function of the output signal processing unit 18 involves displaying the generated bird's eye view image on the display device 30.

1-2. Processing

The image generation processing executed by the control unit 10 will be described using the flowchart in FIG. 3. The image generation processing is a process which starts, for example, when a gear shift lever of the vehicle is shifted to reverse. The image generation processing may start at any other timing, for example, when the speed of the vehicle is decreased.

Firstly, in S110, the control unit 10 acquires captured images from the respective cameras 21F, 21B, 21L and 21R. The captured images may be acquired from the memory 12.

Subsequently, in S120, the control unit 10 extracts obstacles from the respective captured images. At this time, all the obstacles contained in the captured images are detected by image processing. Then, positions of the obstacles are detected based on the coordinates of lower end positions of the obstacles.

Here, the lower end position of the obstacle refers to a location where the obstacle contacts the ground. Specifically, the location where the obstacle contacts the ground is a lower end of each vehicle wheel when the obstacle is a vehicle, and a lower end of each shoe when the obstacle is a pedestrian. The coordinates of the lower end position in the captured image are associated with positions on plane coordinates, and are configured so that the distance to the obstacle can be recognized by identifying the coordinates in the captured image.

Subsequently, in S130, the control unit 10 determines whether there is an obstacle in an overlap region of the captured images. When the control unit 10 determines that there is an obstacle in the overlap region of the captured images in S130, the step proceeds to S140 in which a boundary line is set according to a boundary line setting condition.

Here, the boundary line setting condition employed in the present embodiment is a boundary line setting condition A shown in the top column in FIG. 4.

Specifically, under the boundary line setting condition A, the boundary line is set so that each of the obstacles is contained in the image captured by the camera 21F, 21B, 21L or 21R which is closest in distance to this obstacle, among the plurality of cameras 21F, 21B, 21L and 21R. At this time, (2) the lower end parts of the obstacles are avoided, and (3) the boundary line is made closer to a predetermined position.

Figure 5:
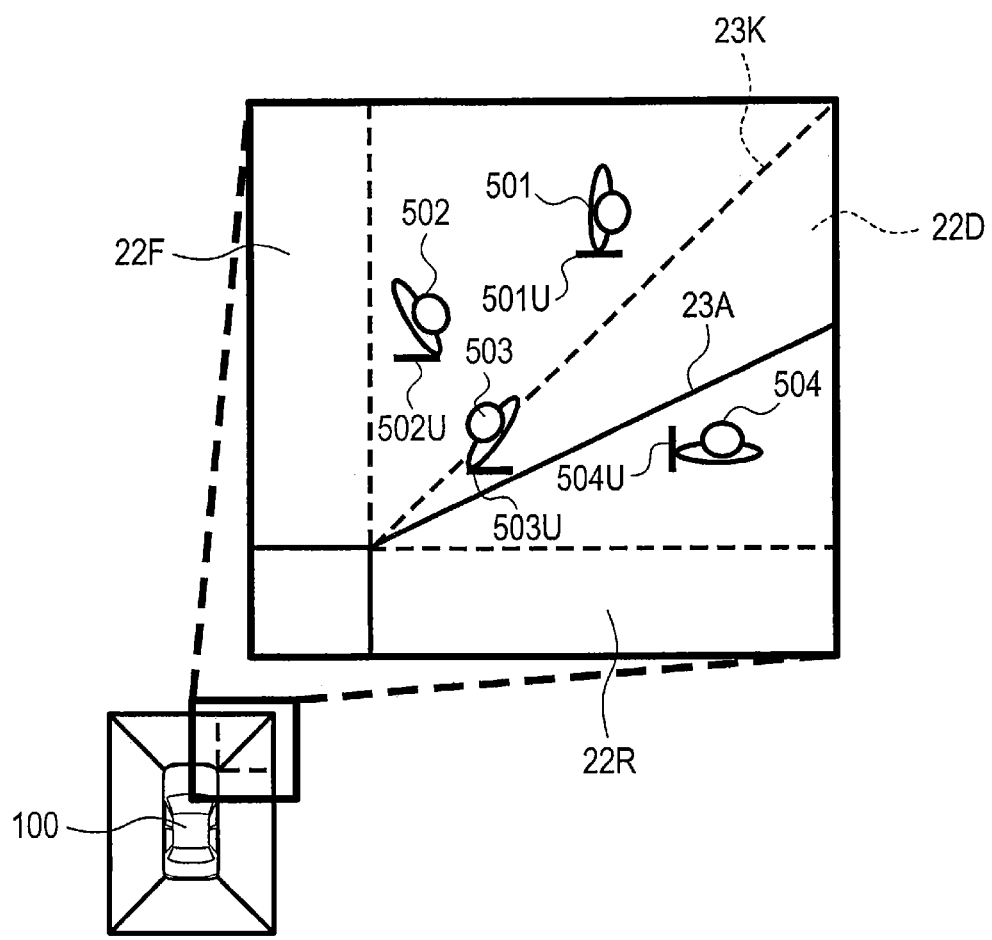
FIG. 5 is a bird's eye view showing a method for setting a boundary line in an overlap region in an embodiment.

For example, in the example shown in FIG. 5, the control unit 10 detects four pedestrians 501, 502, 503 and 504 in the overlap region 22D. At this time, the rightmost pedestrian 504 is closest to the right camera 21R among the cameras 21F, 21B, 21L and 21R, and thus setting is made so that the rightmost pedestrian 504 is contained in the image captured by the right camera 21R.

On the other hand, the pedestrians 501, 502 and 503 other than the rightmost pedestrian 504 are closest to the front camera 21F among the cameras 21F, 21B, 21L and 21R, and thus setting is made so that the pedestrians 501, 502 and 503 are contained in the image captured by the front camera 21F.

Therefore, a boundary line 23A here is set between the rightmost pedestrian 504 and the pedestrian 503 on the left side thereof. At this time, the boundary line 23A is set so as not to overlap with lower end parts 501U, 502U, 503U and 504U when viewed from the cameras that image the respective pedestrians. The boundary line 23A may be set while avoiding all the obstacles, or may be set while avoiding at least the lower end parts 501U, 502U, 503U and 504U as in the present embodiment. Especially, in the present embodiment, the obstacles are converted to be easily recognized visually through obstacle conversion processing as will be described later. Therefore, the obstacles can be made easy to recognize visually, even when cut by the boundary line.

In addition, the boundary line 23A is set to be as close to a predetermined position 23K as possible. In the case of the example shown in FIG. 5, the boundary line 23A is set to be closer to the pedestrian 503 on the left side of the rightmost pedestrian 504 than to the rightmost pedestrian 504. It should be noted that the predetermined position 23K is, for example, a line segment which forms 45° (deg) from each end part of the four corners of the vehicle toward the outside of the vehicle with respect to the traveling direction of the vehicle.

Figure 6:
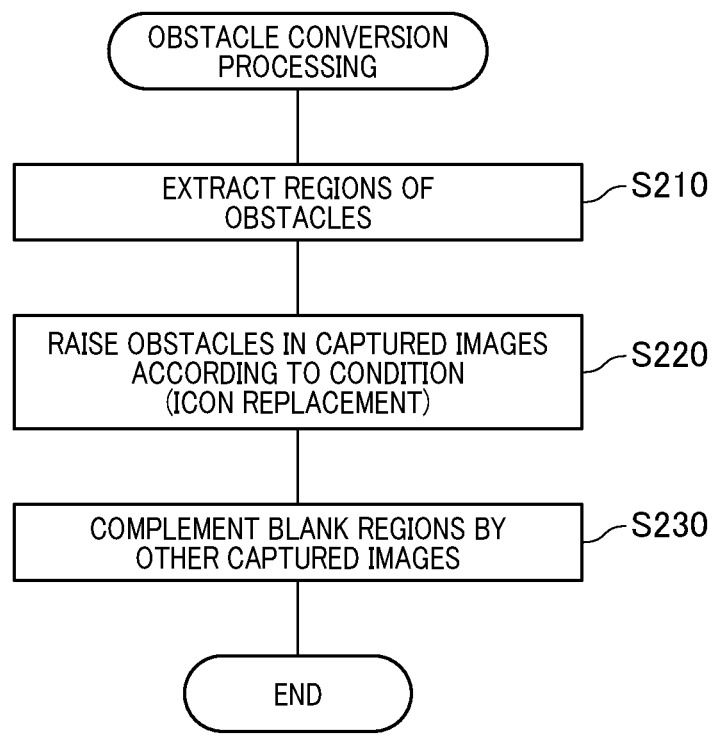
FIG. 6 is a flowchart of obstacle conversion processing.

Subsequently, in S150, the control unit 10 executes obstacle conversion processing shown in the flowchart in FIG. 6.

Firstly, in S210 of the obstacle conversion processing, the control unit 10 extracts regions of the obstacles. In this processing, well-known image processing is performed to identify the contours of the obstacles, and regions enclosed by the contours are extracted as the regions of the obstacles. When the contours of the obstacles are identified, for example, deep learning of semantic segmentation can be used.

Subsequently, in S220, the control unit 10 performs conversion so that the obstacles in the captured images are raised. Specifically, when subjecting the captured images to coordinate-conversion into a bird's eye view image, the control unit 10 replaces the enlarged obstacles with other shrunk obstacle images by performing coordinate-conversion in such a manner as to shrink the enlarged obstacles toward the lower end parts 501U, 502U, 503U and 504U so that the obstacles would not be enlarged in the bird's eye view image. Then, the obstacles enlarged and thus displayed as if they are flat on the ground are expressed as if they are raised. In the processing in S220, the enlarged obstacles are shrunk to be reduced in size, and thus the areas occupied by the obstacles in the bird's eye view image become small, so that blank regions are generated.

Subsequently, in S230, the control unit 10 complements the blank regions formed by the above-described conversion using the other captured images. Specifically, the control unit 10 shrinks the obstacles so that blank regions are generated due to the absence of the image data. The control unit 10 complements the regions using the captured images other than the images captured by the cameras which are closest in distance to the respective obstacles.

Figure 7:
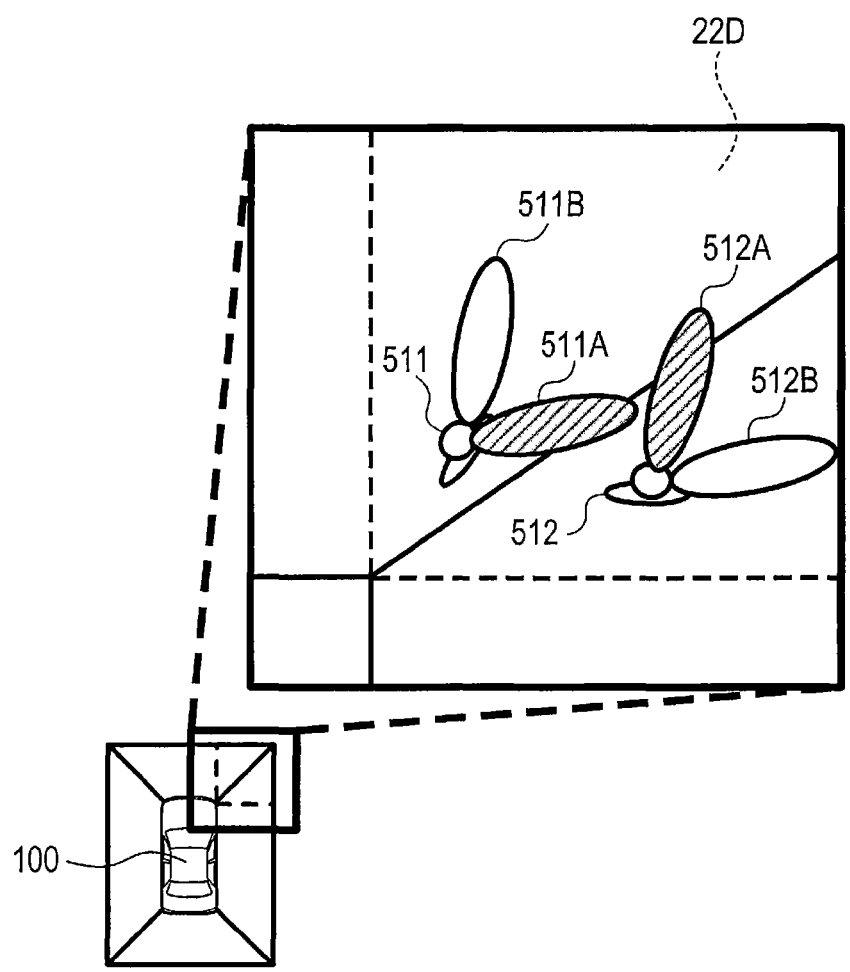
FIG. 7 is a bird's eye view showing regions where obstacles are enlarged.

Specifically, when two pedestrians 511 and 512 are in the overlap region 22D in the example shown in FIG. 7, the left pedestrian 511 is contained in the captured image of the front camera 21F, and the right pedestrian 512 is contained in the captured image of the right camera 21R.

In this case, for the left pedestrian 511, a region 511A is a region to be enlarged in the bird's eye view, and, for the right pedestrian 512, a region 512A is a region to be enlarged in the bird's eye view. However, the respective pedestrians 511 and 512 are imaged also by the other cameras. In the captured images of the other cameras, regions 511B and 512B are each regions to be enlarged in the bird's eye view, and the regions 511A and 512A are well imaged by the other cameras.

Therefore, the regions 511A and 512A in the captured images including the pedestrians 511 and 512 are contained in the bird's eye view image, are complemented by replacing with the regions 511A and 512A in the captured images including the pedestrians 511 and 512 are not included in the bird's eye view image. In this configuration, the images captured by the other cameras are utilized as they are, and thus the actual imaged landscape can be reproduced faithfully.

When such processing is terminated, the obstacle conversion processing is terminated, and the step proceeds to S170 in FIG. 3.

As shown in FIG. 3, when the control unit 10 determines that there is no obstacle in the overlap region of the captured images in S130, the step proceeds to S160 in which the boundary line is set at the predetermined position.

Subsequently, in S170, the control unit 10 connects the respective captured images after conversion at the boundary lines to generate a composite image which is a bird's eye view. Then, the image generation processing in FIG. 3 is terminated.

1-3. Effects

The first embodiment described in detail above provides the following effects.

(1a) The image generation system 1 described above includes the control unit 10. The control unit 10 is, in S120 and S130, configured to acquire a plurality of captured images in which the periphery of the vehicle is imaged by the plurality of imaging units mounted on the vehicle, in S110. The control unit 10 is configured to recognize each of the positions of specific obstacles which are one or more obstacles contained in the plurality of captured images and positioned in the overlap region. The control unit 10 is, in S140 and S160, configured to set the boundary line in the overlap region while avoiding the specific obstacles. The control unit 10 is, in S170, configured to generate a composite image in which the plurality of captured images are combined, using the boundary line as a boundary when combining the plurality of captured images.

Such a configuration makes it possible to prevent the obstacles from being cut by the boundary line in the composite image, and thus the visibility of the composite image can be improved.

(1b) In the image generation system 1 described above, the control unit 10 recognizes at least a location, contacting the ground, of the obstacle as the specific obstacle in S120 and S130.

According to such a configuration, the boundary line is set while avoiding the ground-contact location which is important in recognizing the position of the specific obstacle. Therefore, even when the boundary line cannot be set without cutting the obstacle, a composite image in which the specific obstacle is easily recognized can be obtained.

(1c) In the image generation system 1 described above, the control unit 10, in S140 and S160, sets the boundary line so that each of the specific obstacles is contained in the image captured by the imaging unit which is closest in distance to the specific obstacle among the plurality of imaging units.

Such a configuration makes it possible to reduce the strain of recognizing the specific obstacle and to display it as clearly as possible.

(1d) In the image generation system 1 described above, the control unit 10 is, in S170, configured to generate a bird's eye view image in which the periphery of the vehicle is as seen from above, as the composite image. The control unit 10 is, in S220, configured to replace the specific obstacles to be enlarged in the bird's eye view image with other images.

According to such a configuration, the specific obstacles to be enlarged in the bird's eye view image are replaced with other images, thereby making it possible to display the specific obstacles in the bird's eye view image easier.

(1e) In the image generation system 1 described above, the control unit 10 is configured to complement regions produced by replacing the specific obstacles with other images, using the captured images other than the images captured by the imaging units which are closest in distance to the respective specific obstacles, in S230.

Such a configuration makes it possible to complement locations hidden behind the specific obstacles to be enlarged in the bird's eye view image using the images captured by the other imaging units. Especially, since the location hidden behind the certain specific obstacle is complemented using the other captured images, the status of the location to be complemented can be reproduced as per the actual status.

2. Other Embodiments

The embodiment of the present disclosure has been described above, but the present disclosure can be variously modified to be carried out, without being limited to the above-described embodiment.

(2a) In the above-described embodiment, the control unit 10 is configured to perform coordinate-conversion so that the obstacles in the bird's eye view image being enlarged is not enlarged, thereby replacing the enlarged obstacles with other shrunk obstacle images. However, the present disclosure is not limited thereto. For example, the obstacles may be replaced with icons shown as patterns as the other images. If there is a feature of recognizing the types of the obstacles, the obstacles may be replaced with icons having different patterns according to the types of the obstacles.

(2b) In the image generation system 1 described above, the control unit 10 may temporarily set, in S140 and S160, a plurality of boundary line candidates within the overlap region while avoiding the specific obstacles and set, as the boundary line, the boundary line candidate which is closest to a preliminarily set reference position among the plurality of boundary line candidates.

Figure 8:
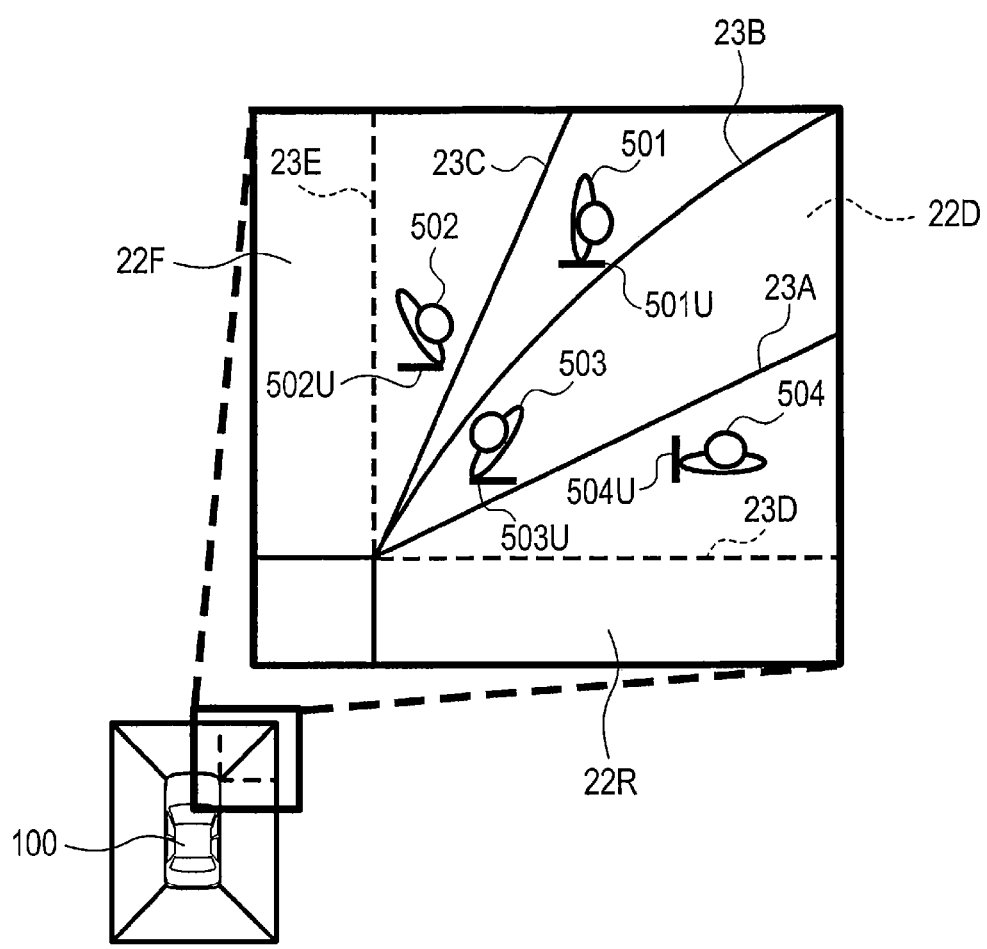
FIG. 8 is a bird's eye view showing a method for setting a boundary line in an overlap region in a first modification.

In this case, for example, a boundary line setting condition B shown in the middle column in FIG. 4 is employed, and a plurality of boundary lines are temporarily set as shown in FIG. 8. Under the boundary line setting condition B, a plurality of boundary lines are temporarily set while avoiding regions containing the obstacles. At this time, (2) the lower end parts of the obstacles are avoided as the regions of the obstacles. For example, in the example shown in FIG. 8, boundary lines 23A, 23B, 23C, 23D and 23E passing between the respective pedestrians 501, 502, 503 and 504 are set as the boundary line candidates.

The boundary line does not have to be a straight line, and may be, for example, an arc, any curved line or the like passing through two end parts which form opposite angles of the overlap region 22D. In the case of the example shown in FIG. 8, the boundary line 23B which is closest to the predetermined position, among these boundary line candidates, is employed as the boundary line.

Such a configuration makes it possible to set the boundary line at a position close to the reference position while avoiding the obstacles.

(2c) In addition, in the above configuration (2b), locations of the obstacles may be cut from the image captured by the camera which is closer to the obstacles, and the cut obstacles may be composited, regardless of the position of the boundary line, to display the obstacles. That is, the image captured by the front camera 21F may be employed for the obstacles, and the image captured by the right camera 21R may be employed for the periphery of the respective obstacles.

(2d) In a case where there is a difference in number of obstacles detected in the overlap region between the captured images when the obstacles are extracted from the captured images, the boundary line may be set so that all the obstacles are contained in the captured image having the largest number of obstacles detected. In this case, for example, a boundary line setting condition C shown in the lower column in FIG. 4 is preferably employed, and a boundary line 23G is preferably set as shown in FIG. 9.

Figure 9:
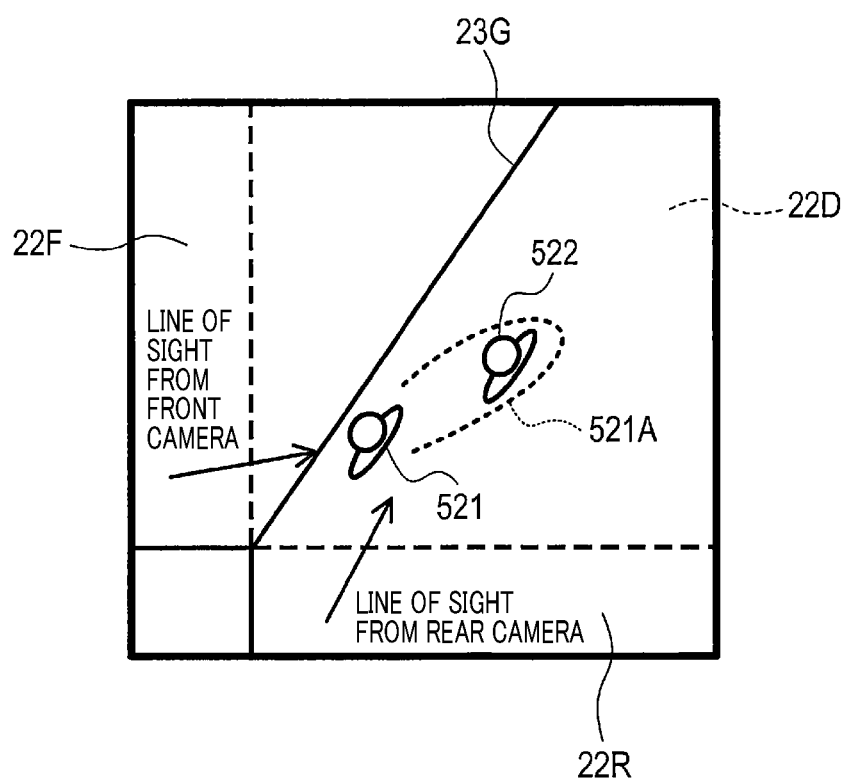
FIG. 9 is a bird's eye view showing a method for setting a boundary line in an overlap region in a second modification.

Specifically, in the example shown in FIG. 9, two pedestrians 521 and 522 are positioned within the overlap region, however, in the image captured by the front camera 21F, the right pedestrian 522 is in a region 521A which is the shadow of the left pedestrian 521, and thus is not recognized. In this case, the number of the obstacles recognized is 1 in the image captured by the front camera 21F, on the other hand, it is 2 in the image captured by the right camera 21R. In this case, preferably, as indicated in the boundary line setting condition C, the boundary is determined so that obstacles are contained in the captured image in which there are a larger number of the obstacles detected in the overlap region, and, at this time, (2) the lower end parts of the obstacles are avoided, and (3) the boundary line is made closer to the predetermined position.

Consequently, the boundary line 23G is set so that the pedestrians 521 and 522 are contained in the image captured by the right camera 21R, as shown in FIG. 9.

(2e) A plurality of functions of one component in the above-described embodiments may be realized by a plurality of components, or one function of one component may be realized by a plurality of components. In addition, a plurality of functions of a plurality of components may be realized by one component, or one function realized by a plurality of components may be realized by one component. Moreover, a part of the features of the above-described embodiments may be omitted. Furthermore, at least a part of the features of any of the above-described embodiments may be added to or replaced with the features of any other embodiment described above.

(2f) In addition to the image generation system 1 described above, the present disclosure can also be realized in various forms such as a control device which is a component of the image generation system 1, a program for allowing a computer to function as the image generation system 1, a non-transitory tangible storage medium, such as a semiconductor memory, having this program recorded therein, and an image generation method.

3. Correspondence in Component Between Embodiments and the Present Disclosure The control unit 10 in the above-described embodiments corresponds to the image generation device referred to in the present disclosure. In addition, the process in S110, among the pieces of processing executed by the control unit 10 in the above-described embodiments, corresponds to the image acquisition unit referred to in the present disclosure, and the pieces of processing in S120 and S130 correspond to the position recognition unit referred to in the present disclosure.

Further, the pieces of processing in S140 and S160 correspond to the boundary line setting unit referred to in the present disclosure, and the process in S170 corresponds to the image compositing unit referred to in the present disclosure. Furthermore, the process in S220 corresponds to the image replacement unit referred to in the present disclosure, and the process in S230 corresponds to the image complementation unit referred to in the present disclosure.

What is claimed is:

1. An image generation device comprising:
   an image acquisition unit mounted to a vehicle, and configured to acquire a plurality of captured images in which a periphery of the vehicle is imaged by a plurality of imaging units having an overlap region where imaging regions thereof partially overlap with each other;
   a position recognition unit configured to recognize positions of specific obstacles which are one or more obstacles positioned in the overlap region;
   a boundary line setting unit configured to set a boundary line so that each of the specific obstacles is contained in an image captured by an imaging unit, among the plurality of imaging units, which is closest in distance to a respective specific obstacle; and
   an image compositing unit configured to generate a composite image in which the plurality of captured images are combined, using the boundary line as a boundary when combining the plurality of captured images, wherein
   the boundary line setting unit temporarily sets a plurality of boundary line candidates within the overlap region while avoiding the specific obstacles, and sets, as the boundary line, the boundary line candidate which is closest to a preliminarily set reference position among the plurality of boundary line candidates.

2. The image generation device according to claim 1, wherein
   the distance to each of the specific obstacles is a distance to a location where the specific obstacles contact the ground, and
   the boundary line setting unit is configured to set the boundary line so that the respective specific obstacle is contained in the image captured by the imaging unit which is closest in distance to a ground-contact location of the respective specific obstacle.

3. The image generation device according to claim 1, wherein
   the image compositing unit is configured to generate a bird's eye view image in which the periphery of the vehicle is as seen from above, as the composite image, and
   the image generation device further includes an image replacement unit configured to replace the specific obstacles to be enlarged in the bird's eye view image with other images.

4. The image generation device according to claim 3, further comprising:
   an image complementation unit configured to complement regions produced by replacing the specific obstacles with other images, using the captured images of the overlap region captured by imaging units, of the plurality of imaging units, which are not imaging units closest in distance to the respective specific obstacles.

5. An image generation device for generating a display image to be displayed on a display device being arranged in a vehicle compartment from images captured by a plurality of cameras which are arranged at different positions of a vehicle, the image generation device comprising:
   a control unit which includes a memory and a CPU, wherein
   the images captured by the plurality of cameras have an overlap region where they partially overlap with each other;
   the control unit recognizes positions of one or more obstacles included in the overlap region of the images captured by the plurality of cameras, which are stored in the memory, based on processing by the CPU;
   the control unit sets a boundary line so that each of the one or more obstacles recognized based on the processing by the CPU is contained in an image captured by a camera, among the plurality of cameras, which is closest in distance to a respective obstacle; and
   the control unit generates a composite image in which the plurality of captured images are combined, using the boundary line as a boundary when combining the plurality of captured images, wherein
   the control unit temporarily sets a plurality of boundary line candidates within the overlap region while avoiding the one or more obstacles, and sets, as the boundary line, the boundary line candidate which is closest to a preliminarily set reference boundary line among the plurality of boundary line candidates.

6. The image generation device according to claim 5, wherein
   the distance to each of the one or more obstacles is a distance to a location where the one or more obstacles contact the ground, and
   the control unit sets the boundary line so that each of the one or more obstacles is contained in the image captured by the camera which is closest in distance to a ground-contact location of the respective obstacle.

7. The image generation device according to claim 5, wherein
   the control unit is configured to generate a bird's eye view image in which a periphery of the vehicle is as seen from above, as the composite image, and
   the control unit replaces the one or more obstacles displayed in an enlarged manner in the bird's eye view image with other images to generate the composite image.

8. The image generation device according to claim 7, wherein
   the control unit complements shade regions produced after replacing the one or more obstacles with other images, using the captured images of the overlap region captured by cameras, among the plurality of cameras, which are not cameras closest in distance to the respective one or more obstacles.

9. An image generation method to be executed by a control unit which is mounted to a vehicle, comprising:
   acquiring a plurality of captured images in which a periphery of the vehicle is imaged by a plurality of imaging units having an overlap region where imaging regions thereof partially overlap with each other;
   recognizing each of positions of specific obstacles which are one or more obstacles positioned in the overlap region;

setting a boundary line so that each of the specific obstacles is contained in an image captured by an imaging unit, among the plurality of imaging units, which is closest in distance to a respective specific obstacle;

generating a composite image in which the plurality of captured images are combined, using the boundary line as a boundary when combining the plurality of captured images;

temporarily setting a plurality of boundary line candidates within the overlap region while avoiding the specific obstacles; and setting, as the boundary line, the boundary line candidate which is closest to a preliminarily set reference position among the plurality of boundary line candidates.

10. An image generation device comprising:

an image acquisition unit mounted to a vehicle, and configured to acquire a plurality of captured images in which a periphery of the vehicle is imaged by a plurality of imaging units having an overlap region where imaging regions thereof partially overlap with each other;

a position recognition unit configured to recognize positions of specific obstacles which are one or more obstacles positioned in the overlap region;

a boundary line setting unit configured to set a boundary line so that each of the specific obstacles is contained in an image captured by an imaging unit, among the plurality of imaging units, which is closest in distance to a respective specific obstacle;

an image compositing unit configured to generate a composite image in which the plurality of captured images are combined, using the boundary line as a boundary when combining the plurality of captured images, the image compositing unit configured to generate a bird's eye view image in which the periphery of the vehicle is as seen from above, as the composite image;

an image replacement unit configured to replace the specific obstacles to be enlarged in the bird's eye view image with other images; and an image complementation unit configured to complement regions produced by replacing the specific obstacles with other images, using the captured images of the overlap region captured by imaging units, among the plurality of imaging units, which are not the imaging units closest in distance to respective specific obstacles.

11. The image generation device according to claim 10, wherein the boundary line setting unit temporarily sets a plurality of boundary line candidates within the overlap region while avoiding the specific obstacles, and sets, as the boundary line, the boundary line candidate which is closest to a preliminarily set reference position among the plurality of boundary line candidates.

12. The image generation device according to claim 10, wherein the distance to each of the specific obstacles is a distance to a location where the specific obstacles contact the ground, and the boundary line setting unit is configured to set the boundary line so that the respective specific obstacle is contained in the image captured by the imaging unit which is closest in distance to a ground-contact location of the respective specific obstacle.

13. An image generation device for generating a display image to be displayed on a display device being arranged in a vehicle compartment from images captured by a plurality of cameras which are arranged at different positions of a vehicle, the image generation device comprising:

a control unit which includes a memory and a CPU, wherein the images captured by the plurality of cameras have an overlap region where they partially overlap with each other;

the control unit recognizes positions of one or more obstacles included in the overlap region of the images captured by the plurality of cameras, which are stored in the memory, based on processing by the CPU;

the control unit sets a boundary line so that each of the one or more obstacles recognized based on the processing by the CPU is contained in an image captured by a camera, among the plurality of cameras, which is closest in distance to a respective obstacle; and the control unit generates a composite image in which the plurality of captured images are combined, using the boundary line as a boundary when combining the plurality of captured images, wherein the control unit is configured to generate a bird's eye view image in which a periphery of the vehicle is as seen from above, as the composite image, the control unit replaces the one or more obstacles displayed in an enlarged manner in the bird's eye view image with other images to generate the composite image, and the control unit complements shade regions produced after replacing the one or more obstacles with other images, using the captured images of the overlap region captured by cameras, among the plurality of cameras, which are not cameras closest in distance to the respective obstacles.

14. The image generation device according to claim 13, wherein the control unit temporarily sets a plurality of boundary line candidates within the overlap region while avoiding the one or more obstacles, and sets, as the boundary line, the boundary line candidate which is closest to a preliminarily set reference boundary line among the plurality of boundary line candidates.

15. The image generation device according to claim 13, wherein the distance to each of the one or more obstacles is a distance to a location where the one or more obstacles contact the ground, and the control unit sets the boundary line so that each of the one or more obstacles is contained in the image captured by the camera which is closest in distance to a ground-contact location of the respective obstacle.

* * * * *